United States Patent
St-Pierre et al.

(10) Patent No.: US 11,220,405 B2
(45) Date of Patent: Jan. 11, 2022

(54) DYNAMICALLY ADJUSTING BOARD STACKING SYSTEM

(71) Applicant: NOVILCO INC., St-Felicien (CA)

(72) Inventors: Isabelle St-Pierre, St-Prime (CA); Michel St-Pierre, St-Prime (CA); Jean-Michel St-Pierre, St-Felicien (CA); Eric Vallee, Dolbeau-Mistassini (CA)

(73) Assignee: 9374-4399 Québec Inc., St-Félicien (CA)

( * ) Notice: Subject to any disclaimer, the term of this patent is extended or adjusted under 35 U.S.C. 154(b) by 0 days.

(21) Appl. No.: 16/575,963

(22) Filed: Sep. 19, 2019

(65) Prior Publication Data

US 2020/0087085 A1 Mar. 19, 2020

Related U.S. Application Data

(60) Provisional application No. 62/733,279, filed on Sep. 19, 2018.

(51) Int. Cl.
*B65G 57/24* (2006.01)
*B65G 57/03* (2006.01)

(52) U.S. Cl.
CPC ......... *B65G 57/245* (2013.01); *B65G 57/035* (2013.01); *B65G 2201/0282* (2013.01);
(Continued)

(58) Field of Classification Search
CPC .............. B65G 57/245; B65G 57/035; B65G 2203/0241; B65G 2203/0233;
(Continued)

(56) References Cited

U.S. PATENT DOCUMENTS

| | | | | |
|---|---|---|---|---|
| 3,643,816 A | * | 2/1972 | Jacobsen | B65G 37/005 414/788.9 |
| 4,195,959 A | * | 4/1980 | Schmitt | B65G 57/245 414/788.9 |

(Continued)

FOREIGN PATENT DOCUMENTS

| | | |
|---|---|---|
| CN | 102874604 A | 1/2013 |
| CN | 202754549 U | 2/2013 |

(Continued)

*Primary Examiner* — Lynn E Schwenning
(74) *Attorney, Agent, or Firm* — Neugeboren O'Dowd PC

(57) ABSTRACT

A board stacking system for stacking board layers into a stack, and associated method are provided. The board stacking system includes a board stacking apparatus adapted to arrange board layers into the stack. The board stacking apparatus having a stack holder comprising an adjustable stacking area for supporting the stack, the stacking area having a length defined between a front edge and a back edge. The board stacking apparatus further having one or more stacking arms operable to receive board layers from a board dispensing mechanism and sequentially arrange the board layers onto the forming stack. The board stacking system further includes a scanner positioned and configured for measuring a width of the board layers and transfer the information to the stack holder to allow adjustment of the length of the stacking area to substantially correspond to the width of the previously measured board layer.

9 Claims, 5 Drawing Sheets

(52) U.S. Cl.
CPC ............... *B65G 2203/0233* (2013.01); *B65G 2203/0241* (2013.01)

(58) Field of Classification Search
CPC ........... B65G 2201/0282; B65G 57/06; B65G 57/10; B65G 57/09; B65G 57/16; B65G 57/18
See application file for complete search history.

(56) References Cited

U.S. PATENT DOCUMENTS

| | | | |
|---|---|---|---|
| 4,310,274 A | 4/1982 | Moseley | |
| 4,679,381 A * | 7/1987 | Truninger | B65G 57/18 414/794.1 |
| 4,892,458 A * | 1/1990 | Proulx | B65G 57/18 414/790 |
| 5,215,428 A | 6/1993 | Masini | |
| 5,613,827 A | 3/1997 | Vande Linde | |
| 7,694,800 B2 * | 4/2010 | Verroeye | B65G 57/18 198/401 |
| 9,272,852 B2 * | 3/2016 | St-Pierre | B65G 57/245 |
| 9,492,984 B2 * | 11/2016 | Ben-David | B31B 50/00 |
| 2003/0031550 A1 | 2/2003 | Dube et al. | |
| 2004/0191049 A1 * | 9/2004 | Winkler | B65G 57/03 414/791.6 |
| 2006/0045723 A1 * | 3/2006 | Hogue | B65G 57/005 414/789.5 |
| 2006/0263194 A1 * | 11/2006 | Ahlers | B65G 57/186 414/793 |
| 2008/0223768 A1 * | 9/2008 | Ahrens | B07C 5/14 209/518 |
| 2010/0000840 A1 * | 1/2010 | Tsai | B65G 57/10 198/347.1 |
| 2016/0016734 A1 * | 1/2016 | Smith | B65G 47/256 198/349 |
| 2017/0327324 A1 | 11/2017 | Raybon et al. | |

FOREIGN PATENT DOCUMENTS

| | | |
|---|---|---|
| CN | 103419256 A | 12/2013 |
| CN | 203438330 U | 2/2014 |
| CN | 203529567 U | 4/2014 |
| CN | 203652798 U | 6/2014 |
| CN | 20378288 U | 7/2014 |
| CN | 104003200 A | 8/2014 |
| CN | 203998135 U | 12/2014 |
| CN | 204038622 U | 12/2014 |
| CN | 104786300 A | 7/2015 |
| CN | 104786301 A | 7/2015 |
| CN | 104786305 A | 7/2015 |
| CN | 105415454 A | 3/2016 |
| CN | 105600489 A | 5/2016 |
| CN | 105692217 A | 6/2016 |
| CN | 106185161 A | 12/2016 |
| CN | 107265128 A | 10/2017 |
| CN | 206645548 U | 11/2017 |
| CN | 206855664 U | 1/2018 |
| CN | 206955224 U | 2/2018 |
| CN | 107499911 A | 12/2018 |
| DE | 2533649 A1 | 2/1977 |
| DE | 102008060823 A1 | 6/2010 |
| EP | 2524885 A1 | 11/2012 |
| FR | 2277727 A1 | 2/1976 |
| FR | 2668133 A1 | 4/1992 |
| FR | 2836855 A1 | 9/2003 |
| WO | 2016142498 A1 | 9/2016 |

* cited by examiner

DYNAMICALLY ADJUSTING BOARD STACKING SYSTEM

CROSS-REFERENCE TO RELATED APPLICATIONS

This application claims priority under 35 USC § 119(e) of U.S. Provisional Application No. 62/733,279, filed Sep. 19, 2018, entitled "DYNAMICALLY ADJUSTING BOARD STACKING SYSTEM", the entirety of which is hereby incorporated by reference.

FIELD OF THE INVENTION

The present invention relates to automated wood processing equipment and more particularly concerns a dynamically adjusting board stacking system.

SUMMARY OF THE INVENTION

According to a first aspect, a board stacking system for stacking a plurality of board layers into a stack is provided. The board stacking system includes a board stacking apparatus adapted to form the stack and includes a stack holder having an adjustable stacking area for supporting the stack, the stacking area having a length defined between a front edge and a back edge of the stack holder. The board stacking apparatus further having one or more stacking arms operable to receive a corresponding board layer and subsequently arrange the board layer onto the forming stack. Additionally, the board stacking system includes a board dispensing mechanism adjacent the board stacking apparatus for carrying boards along a flow path, and transferring layers of said boards onto the stacking arms of the board stacking apparatus. The board stacking system further includes a scanner positioned and configured for measuring a width of the board layers being carried via the board dispensing mechanism prior to being transferred to the board stacking apparatus. The stack holder is operable to adjust the length of the stacking area prior to each board layer being transferred onto the stacking arms, the adjusted length of the stacking area substantially corresponds to the width of the previously measured board layer.

According to a possible embodiment, the stack holder includes one or more movable stoppers operatively mounted proximate the rear edge adapted to move towards and away from the front edge to adjust the length of the stacking area.

According to a possible embodiment, the movable stoppers are adapted to retain the board layer within the stacking area upon retraction of the stacking arms.

According to a possible embodiment, the movable stoppers have contact sensors configured to detect contact with the movable stoppers, and wherein displacement of the stacking arms into the retracted position is initiated upon engagement of a first dispensed board with the movable stoppers.

According to a possible embodiment, the stacking arms are operable between a receiving position where the stacking arms extend above the stack and across the length of the stacking area for receiving and supporting a corresponding board layer, and a retracted position where the stacking arms slide rearwardly from under the supported board layer, thereby dropping the board layer onto the stack.

According to a possible embodiment, the board dispensing mechanism comprises a retractable stop adapted to engage the flow path and allow boards to gather in a side-by-side configuration and form a board layer.

According to a possible embodiment, each board layer includes a predetermined number of boards.

According to a possible embodiment, the stack holder is further adapted to adjust a depth of the stacking area so as to lower the stack subsequently to the dropping of each board layer thereon.

According to a second aspect, a method of forming a stack in a stacking area using boards being carried along a flow path is provided. The method comprising the steps of measuring a width of a board layer comprising a predetermined number of boards; adjusting a length of the stacking area to substantially correspond to the measured width; transferring the corresponding board layer in the stacking area; and cyclically repeating these steps until the stack is complete.

DETAILED DESCRIPTION OF THE INVENTION

Figure 1:
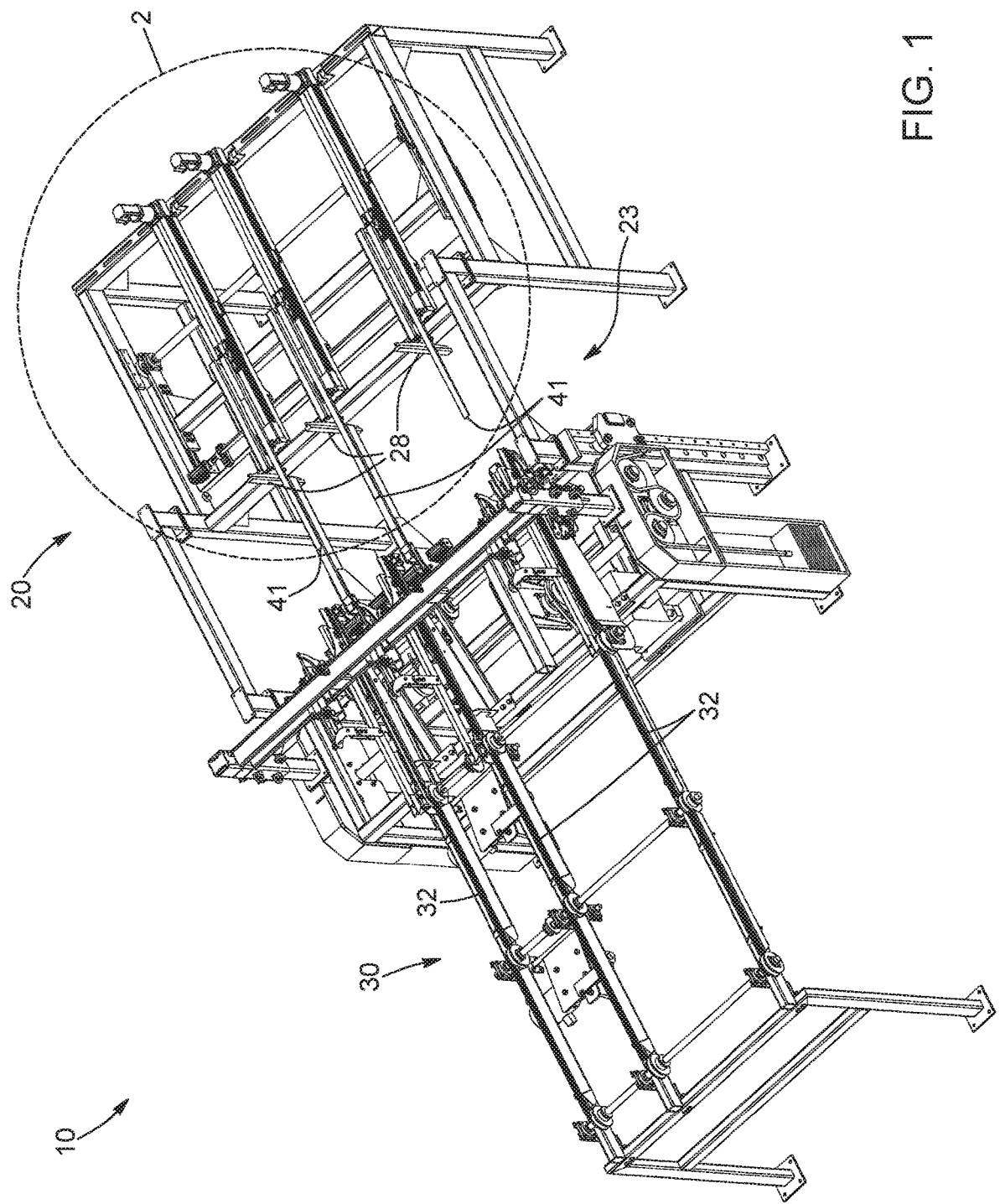
FIG. 1 is a perspective view of a board stacking system according to an embodiment, showing a board dispensing mechanism adjacent a board stacking apparatus.

Various embodiments are described in the following disclosure with reference to the accompanying figures. It should be understood that the elements of these figures are not necessarily depicted to scale, since emphasis is placed upon clearly illustrating the elements and structures of the present embodiments. In the following description, it will be understood that the same numerical references refer to similar elements. Furthermore, for the sake of simplicity and clarity, namely so as to not unduly burden the figures with several reference numbers, not all figures contain references to all the components and features, and references to some components and features can thus be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

As will be explained below in relation to various embodiments, a dynamically adjustable wooden board stacking system, or simply "stacking system", is provided. It should be understood that, as used herein, the expression "dynamically adjustable" refers to the ability of the stacking system to be adjusted during operation thereof. In some implementations, the adjustments can be made without stopping the stacking operation.

In some implementations, the stacking system includes a board stacking apparatus for arranging board layers into a stack, and a board dispensing mechanism for transferring wooden boards to the board stacking apparatus. The board dispensing mechanism can include a conveyor defining a flow path along which wooden boards are transported. Moreover, the board stacking apparatus can include a stack holder defining a stacking area where the wooden boards are effectively stacked in layers. The stacking system can include a scanner for gathering information relating to the dimensions of the wooden boards, such as measuring a width of a given layer being transported along the flow path. The gathered information can be used to correspondingly adjust the size of the stacking area during a stacking sequence to facilitate stacking operations of the board layers, as will be described further below.

Referring broadly to FIGS. 1 to 3c, there is shown a dynamically adjustable board stacking system 10 (hereafter simply "stacking system 10") according to one embodiment. In this embodiment, the stacking system 10 includes a board stacking apparatus 20 for stacking a plurality of board layers 12 into a stack 14, and a board dispensing mechanism 30 for transferring boards 11 to the board stacking apparatus 20. In addition, the stacking system 10 includes a scanner 50 configured to measure a width of each board layer 12 being carried by the board dispensing mechanism 30 in order to effectively separate the boards into corresponding board layers 12, in a manner that will be further described below. As will be readily understood by a person skilled in the art, a board layer 12 can be formed of a finite number of boards 11 disposed side-by-side, and the stack 14 can be formed of a finite number of board layers 12 stacked one on top of the other. The number of boards 11 in a given layer 12 can be predetermined such that each layer 12 includes the same number of boards 11. In the context of the present invention, a board 11 may be understood to refer to any type of lumber to be stacked, such as, without being limitative, flitches, planks, joist, beams, panels or the like.

Figure 3A:
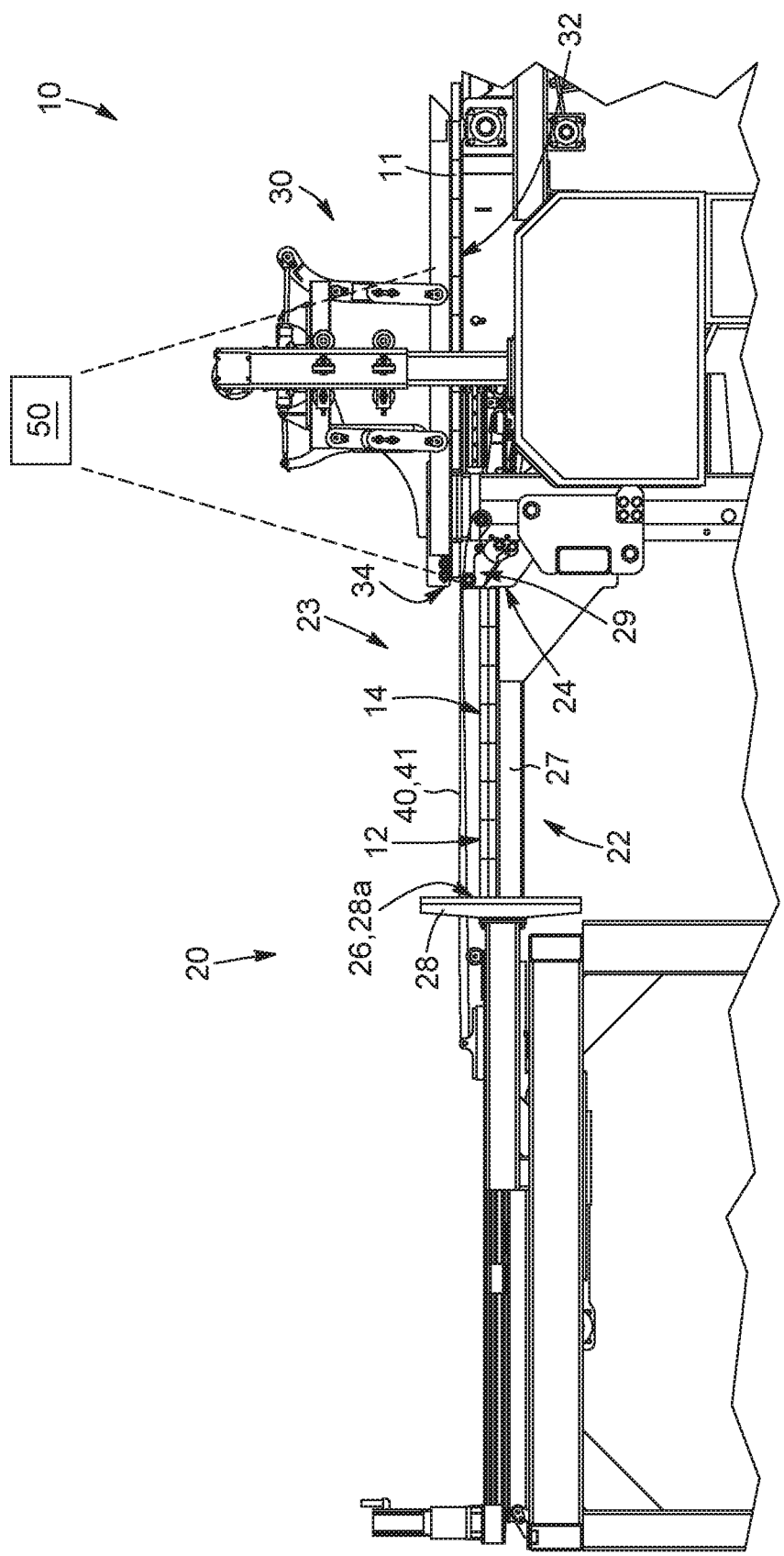
FIG. 3a is a side view of a board stacking system according to an embodiment, showing the stacking arms in a receiving position and showing a scanner overhanging the dispensing mechanism.

Referring more specifically to FIGS. 1 and 3a, the dispensing mechanism 30 can include one or more conveyors 32 defining a flow path along which the boards 11 are carried. During operation of the stacking system 10, the boards 11 are dispensed from the conveyor 32 to the board stacking apparatus 20 in a side-by-side configuration. In some embodiments, the boards 11 are dispensed in sequential layers, which can then be placed one on top of the other in order to form the stack 14. For example, each stack 14 can be formed of between approximately 10 to 50 layers, although it is appreciated that other configurations are possible, based on different needs of the industry. The layers of the stack 14 can be spaced apart by corresponding spacers (e.g., sticks) or simply lay directly on one another. It is appreciated that the conveyors 32 can include, for example, a traditional conveyor belt, a lugged conveyor, a rolling conveyor or any other suitable conveying mechanism. It should be further appreciated that the dispensing mechanism 30 can include any other suitable type of mechanism adapted to carry a plurality of boards 11 along a flow path and/or in a predetermined direction, e.g., towards the board stacking apparatus 20.

In some embodiments, and as seen in FIG. 3a, the board stacking apparatus 20 can include a stack holder 22 having an adjustable stacking area 23 in which the stack 14 can be formed. In the present embodiment, the adjustable stacking area 23 is defined between a front edge 24 and a rear edge 26 of the stack holder 22. The edges 24, 26 are joined together at a bottom section thereof via a planar support surface 27 adapted to support the forming stack 14. The front edge 24 can be positioned proximate the board dispensing mechanism 30 and the rear edge 26 positioned opposite the front edge 24. Therefore, it is appreciated that the adjustable stacking area 23 has a length extending between the front and rear edges 24, 26. In some embodiments, the rear edge 26 can define the extremity at which the boards 11 and/or board layers 12 can extend within the stacking area 23. For example, the stack holder 22 can include one or more blocking elements, such as stoppers 28, positioned proximate the rear edge 26 for stopping movement of the boards 11 and/or board layers 12. In other words, a first dispensed board 11 of each board layer 12 being transferred to the stacking apparatus 20 abuts against the stoppers 28 prior to being stacked. However, it is appreciated that other configurations are possible.

In some embodiments, the stack holder 22 is operable to adjust the length of the adjustable stacking area 23 to accommodate for a width of each board layer 12 being transferred therein. For example, at least one of the front and rear edges 24, 26 of the stack holder 22 can be displaced, or include displaceable elements adapted to move towards and/or away from the opposite edge, effectively adjusting the length of the stacking area 23. In some embodiments, the adjustable stacking area 23 can be dynamically adjusted during operation of the stacking system 10, for example during a stacking routine configured for forming a given stack 14, as will be described further below. In the present embodiment, the stoppers 28 can include movable stoppers 28 operable to adjust the length of the adjustable stacking area 23. More specifically, each movable stopper 28 can include a block or body having a stopping surface 28a substantially in line with the rear edge 26 for stopping movement of the boards 11. In addition, the movable stoppers 28 are adapted to move towards and away from the front edge 24 either during the stacking routine or at any other suitable time. In some embodiments, the movable stoppers 28 are operated (i.e., displaced) via any suitable mechanism, such as a pneumatic cylinder connected to a back section of the movable stoppers 28 for example. It is appreciated that the movable stoppers 28 can include any suitable blocking element and/or structure having a stopping surface 28a having any suitable shape and/or size for preventing the first dispensed board 11 of a given board layer 12 from traveling further.

Figure 2:
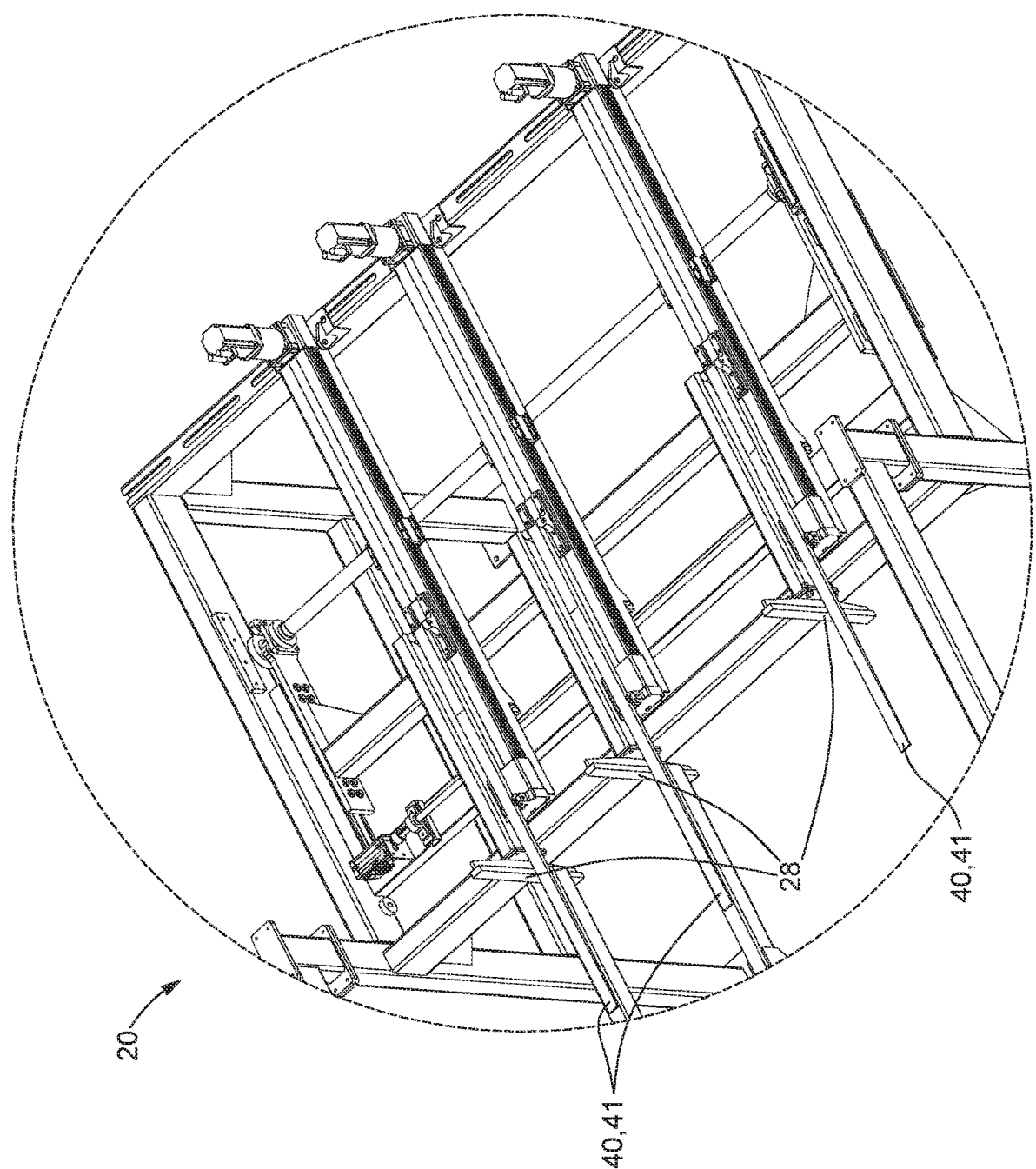
FIG. 2 is an enlarged perspective view of the board stacking apparatus of FIG. 1, showing stacking arms extending within a stacking area, according to an embodiment.

Referring to FIG. 2, in addition to FIGS. 1 and 3a, the board stacking apparatus 20 includes movable stacking elements 40 adapted to receive board layers 12 from the dispensing mechanism 30 and load the layers within the adjustable stacking area 23 in order to form the stack 14. In the present embodiment, the movable stacking elements 40 can include a plurality of stacking arms 41 adapted to effectively stack board layers 12 within the stacking area 23. The stacking arms 41 can be adapted to receive and support a board layer 12 prior to dropping the board layer 12 atop the planar support surface 27, or atop the previously dropped board layer 12, to form the stack 14. It should be understood that the stacking arms 41 can be adapted to receive a single board layer 12 at a time. Therefore, operation of the conveyor 32 can be temporarily halted or reversed during stacking operations of the stacking arms 41 for example. In other words, the dispensing mechanism 30 can be configured to allow the stacking arms 41 to drop a first board layer 12 prior to transferring a second board layer 12 thereon. The number of stacking arms 41 can vary according to the type of wood of the boards to be stacked (hardwood allowing greater width between each stacking arm 41 than softwood) and to the length of the boards to be stacked (the longer the boards, the more stacking arms are needed). The length of each stacking arm 41 is at least sufficient to cover the width of the stack 14, spanning the length of the stacking area 23 between the rear 24 and front 26 edges but can alternatively be longer or shorter. However, it is appreciated that other configurations and embodiments of the stacking arms 41 are possible, such as those described in Canadian patent No. CA 2,810,111, the entire contents of which is incorporated herein by reference. The board stacking apparatus 20 can include stacking elements 40 which differ from the above-described stacking arms 41.

Figure 3B:
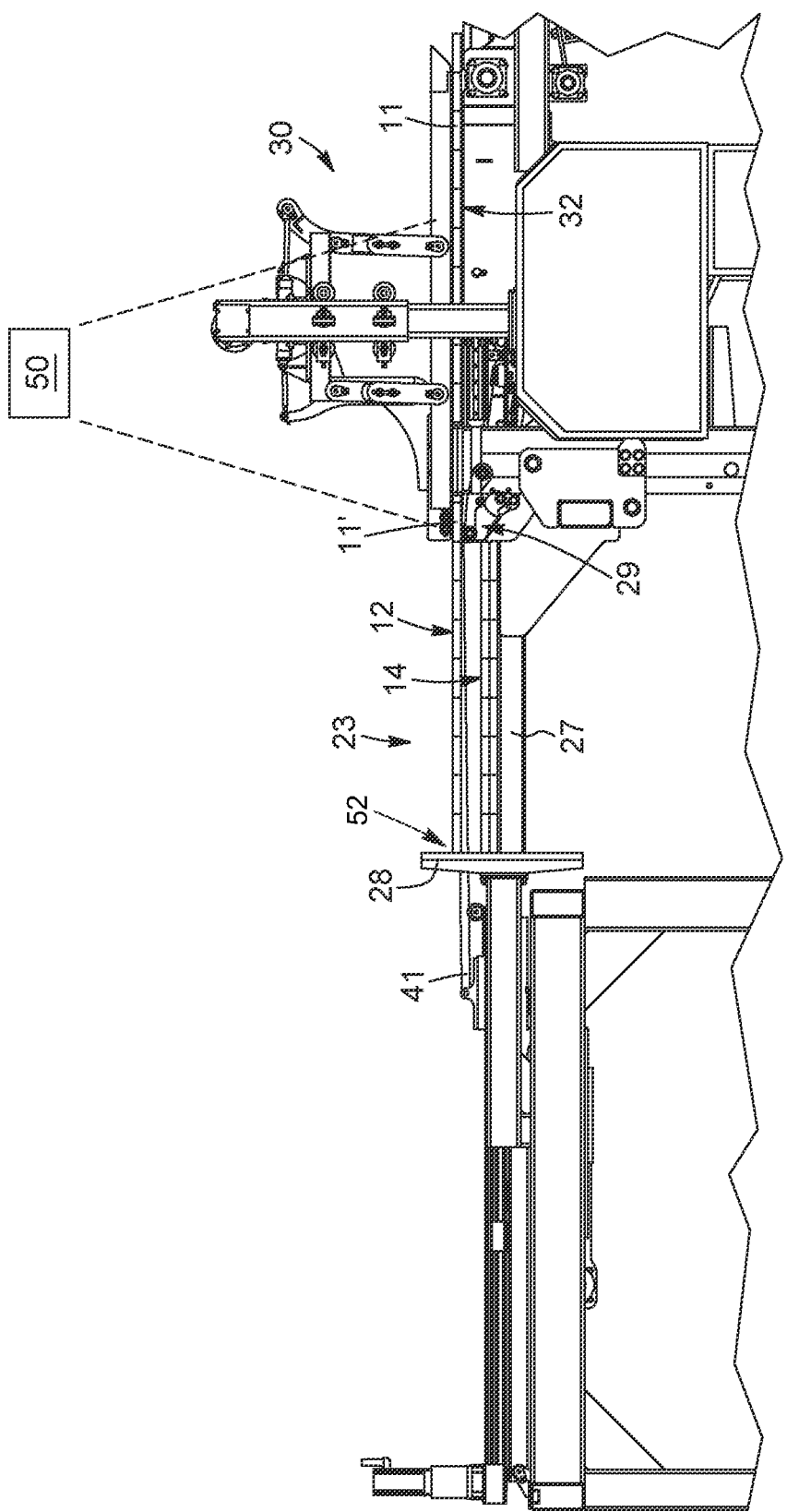
FIG. 3b is a side view of the board stacking system of FIG. 3a, showing the stacking arms in the receiving position and a board layer being transferred thereon.
Figure 3C:
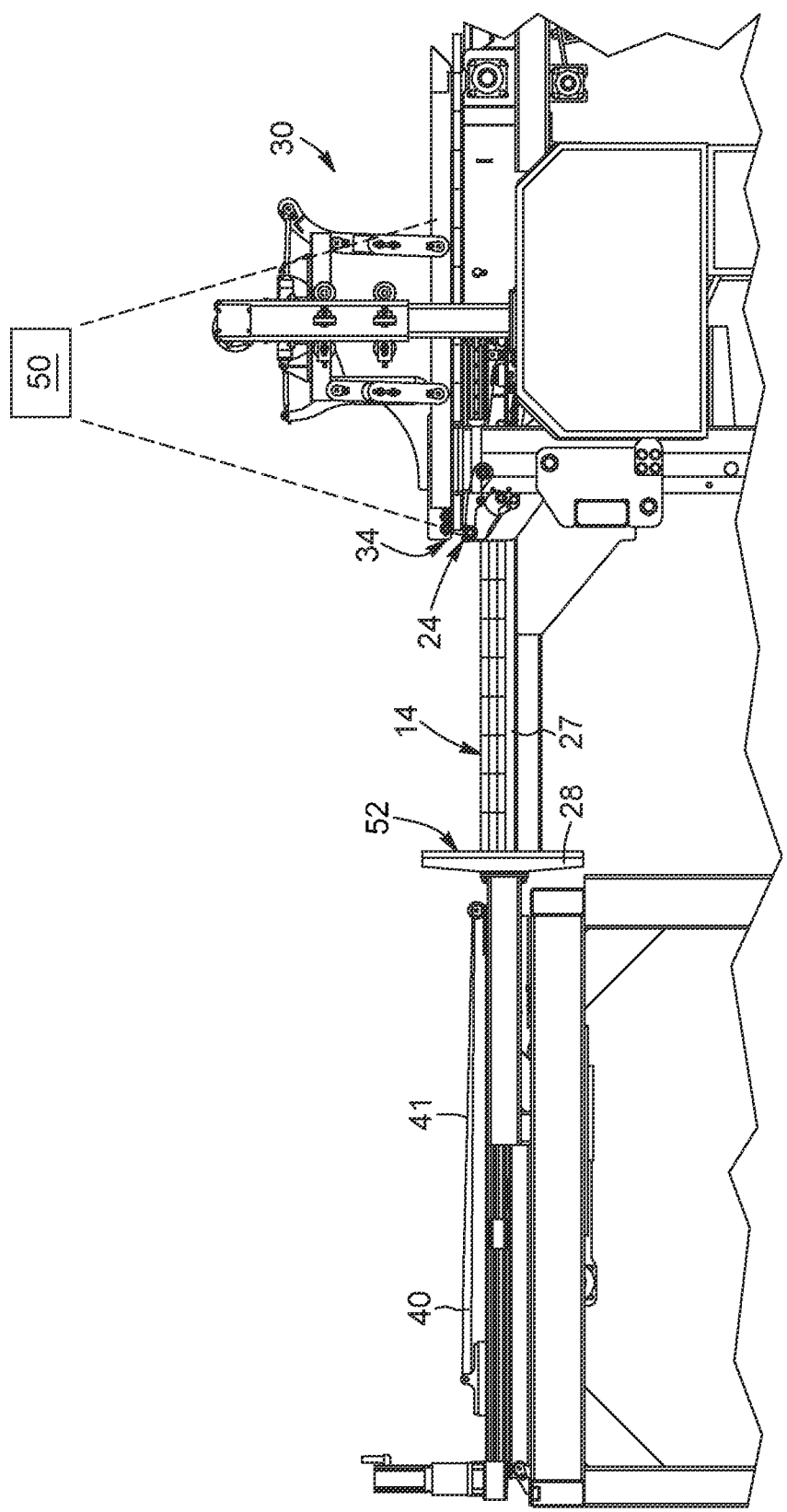
FIG. 3c is a side view of the board stacking system of FIG. 3a, showing the stacking arms in a retracted position.

In some embodiments, and as best seen in FIGS. 3a to 3c, the stacking arms 41 can be operated between a receiving position (FIGS. 3a and 3b) and a retracted position (FIG. 3c) according to the aforementioned stacking routine. It will be understood that in the context of the present description, the forward direction of the stacking arms 41 is directed towards the dispensing mechanism 30 while a rearward direction is understood as moving away from the dispensing mechanism 30. With reference to FIGS. 3a and 3b, while in the receiving position, the stacking arms 41 can extend above the stack 14 and across the length of the adjustable stacking area 23. In the present embodiment, the stacking arms 41 extend from behind the rear edge 26 and between and/or adjacent to the stoppers 28, as best seen in FIG. 2, towards the dispensing mechanism 30 proximate the front edge 24. It is appreciated that, in alternative embodiments, the stacking arms 41 can extend from the dispensing mechanism 30 (e.g., below the conveyor 32) towards the stoppers 28 proximate the rear edge 26 for example. Once extended across the length of the stacking area 23, a board layer 12 can be dispensed on the extended stacking arms 41 via operation of the conveyor 32. It is appreciated that the stacking arms 41 can be substantially leveled with the conveyor 32 in order to facilitate the transfer of boards 11 from the conveyor 32 to the stacking arms 41, although other configurations are possible. In some embodiments, the stack holder 22 can be provided with an abutment surface 29 proximate the front edge 24 for supporting the ends of the stacking arms 41 when in the receiving position. It should thus be understood that the support provided by the abutment surface 29 facilitates maintaining the stacking arms 41 substantially leveled with the conveyor 32.

Now referring to FIG. 3c, in addition to FIGS. 3a and 3b, from the receiving position, the stacking arms 41 slide rearwardly behind the stoppers 28 into the retracted position, therefore clearing the stacking area 23 and allowing the board layer 12 to be dropped on top of the stack 14. It should be understood that the board layer 12 supported by the stacking arms 41 is removed therefrom upon retraction of the stacking arms 41 due to the presence of the stoppers 28. As the stacking arms 41 retract, each board 11 of the board layer 12 drops below to form the stack 14. In the present embodiment, during the stacking routine, the planar support surface 27 can be lowered by a distance corresponding substantially to the height of one board layer 12, every time a new layer 12 is added to the stack 14. Thus, the vertical level of the top layer of the stack 14 remains substantially constant during the stacking routine, as is well known in the art. It is thus appreciated that the stack holder 22 can include any suitable lift (not shown) or equivalent device commonly used in the industry for displacing the planar support surface 27.

In some embodiments, the board dispensing mechanism 30 can include a device configured to stop the forward motion of the boards 11 being carried along the flow path once they reach a predetermined location. As such, the boards 11 being carried can abut against one another and gather in a side-by-side manner in order to form a given board layer 12 prior to being transferred to the board stacking apparatus 20. In the present embodiment, the board dispensing mechanism 30 includes at least one retractable stop 34 adapted to engage the flow path in order to stop the flow of boards 11 being carried. The retractable stop 34 can be operated to engage the flow path using any suitable manner, such as a linear or rotating actuator for example. In some embodiments, the retractable stop 34 is positioned near the exit of the dispensing mechanism 30 (i.e., near the end of the conveyor 32), proximate the front edge 24 of the stack holder 22. As such, the boards 11 being carried along the flow path abut against the retractable stop 34 to gather proximate the end of the conveyor 32. It should be understood that the retractable stop 34 allows the stacking system 10 to continuously form board layers 12 on the conveyor 32 during stacking operations of the board stacking apparatus 20. In other words, while the stacking arms 41 are dropping a first board layer 12 within the stacking area 23, the retractable stop 34 allows a second board layer to be formed.

Still referring to FIGS. 3A to 3C, the stacking system 10 can include a scanner 50 positioned and configured for measuring a width of each board layer 12 being carried by the conveyor 32. Therefore, it should be understood that the scanner 50 measures the width of each board layer 12 before said board layer 12 is transferred to the board stacking apparatus 20.

In the present embodiment, the scanner 50 can be positioned so as to overhang the conveyor 32 proximate the end thereof. As such, the scanner 50 is adapted to monitor the boards 11 blocked by the retractable stop until enough boards 11 have gathered to form a board layer 12. It is appreciated that stopping forward movement of the boards 11 and/or board layers 12 can facilitate operation of the scanner 50 in measuring the width of the last formed board layer 12. In some embodiments, the scanner 50 can be configured to monitor a given section of the conveyor 32 in order to detect the presence of boards 11 therein. The length of the monitored section can vary according to the type of wood being formed into layers 12. However, it should be understood that the length of the monitored section can be programmed to substantially correspond to the width of a board layers 12 being formed. Therefore, when boards 11 have filled the monitored section of the conveyor 32, the scanner 50 measures the width of the board layer 12 from a forward edge of the first board 11 abutting against the retractable stop, and a rear edge of the last board 11 detected in the monitored section. Once the width of the board layer 12 has been measured, the information is transmitted to the stack holder 22 which can adjust the length of the adjustable stacking area 23 accordingly. More specifically, the stack holder 22 adjusts the length of the stacking area 23, via movement of the movable stoppers 28, to substantially correspond to the width of the incoming board layer 12 (i.e., the previously measured board layer 12). It is appreciated that the stack holder 22 can be provided with a controller adapted to receive signals from the scanner 50 and operate the movable stoppers 28 according to the received signal. It should also be understood that the boards 11 forming a corresponding board layer 12 can have different widths due to various factors and/or defects such as curvature of the wood (cupped, twisted, crooked, etc.) for example. Therefore, in order for each board layer 12 to be fully transferred onto the stacking arms 41, the length of the stacking area 23 is adjusted prior to the transfer of each board layer 12 (i.e., the adjustable stacking area 23 is dynamically adjusted).

It should be understood that following the adjustment of the adjustable stacking area 23, the retractable stop 34 can be retracted, thus allowing the last formed board layer 12 to be transferred onto the stacking arms 41. It is appreciated that adjusting the length of the adjustable stacking area 23 can advantageously prevent any additional (i.e., unwanted) boards 11 from fully entering the stacking area 23 when transferring a board layer 12 onto the stacking arms 41. However, if an additional board 11' is transferred, at least partially, onto the stacking arms 41 following the board layer 12, the conveyor 32 can be operated in a rearward direction in order to remove the excess board 11'. In other words, and as seen in FIG. 3b, a section of the additional board 11' can only partially contact the stacking arms 41 due to the adjusted length of the stacking area 23. Therefore, the remaining section of the additional board 11' remains in contact with the conveyor 32. It will thus be understood that, reversing the direction of the conveyor 32 effectively removes the additional board 11' from the stacking arms 41 without displacing the board layer 12. The retractable stop 34 can then engage the flow path, and the conveyor 32 can be operated forwardly in order to form a subsequent board layer 12.

In some embodiments, the stoppers 28 can be provided with sensors 52 configured to detect contact between the transferred board layer 12 and the stoppers 28. As mentioned above, operation of the conveyor 32 can be halted and/or reversed after having transferred a board layer 12 onto the stacking arms 41. As such, once contact between the stoppers 28 and the first transferred board 11 has been detected, the sensors 52 transmit a signal to a dispensing mechanism controller which can control operation of the conveyor 32 (e.g. reverse the flow of boards 11). It should be appreciated that any other suitable type of sensors can be used for detecting when a board layer 12 has been transferred onto the stacking arms 41. For example, a light source can be positioned proximate the stoppers 28 so as to project a light beam onto an area of the conveyor, and once the light beam is broken by the first dispensed board 11 of a board layer 12, the conveyor 32 can be stopped.

As previously mentioned, in order to stack each new board layer 12 onto the stack 14, the stacking arms 41 are moved according to the stacking routine, which will now be described in greater detail. In the present embodiment, the stacking routine includes at least three successive base steps which are repeated a predetermined number of times in the formation of each stack 14.

The first step is the positioning step, shown on FIG. 3A, where the stacking arms 41 are positioned in the receiving position where the arms 41 extend across the stacking area 23 and above the forming stack 14. In this step, the stacking arms 41 extend towards the board dispensing mechanism 30 proximate to the exit of the conveyor 32. As mentioned above, the stacking arms 41 can be evenly levelled with the dispensing mechanism 30 in order to facilitate the transfer of the boards 11 from the dispensing mechanism 30 to the stacking arms 41. It should be understood that during the positioning step of the stacking arms 41, the scanner 50 effectively measures the width of the board layer 12 formed on the conveyor 32 and transmits the information to the stack holder 22.

The second step is the dispensing step. During this step shown on FIG. 3b, the stacking arms 41 are maintained in the receiving position while the boards 11 are transferred from the dispensing mechanism 30. In some embodiments, the movable stoppers 28 are operated in order to adjust the length of the adjustable stacking area 23 during the positioning step. However, it is appreciated that the stacking area 23 can be adjusted substantially simultaneously during the transfer of the boards 11 from the dispensing mechanism 30.

The second step terminates when the new layer 12 has been entirely transferred onto the stacking arms 41. More specifically, in the present embodiment, the second step ends when the sensors of the movable stoppers 28 detect a contact between the first transferred board 11 and the movable stoppers 28.

The third step is the dropping step. In this step, the stacking arms 41 are moved in a rearward direction, typically until the arms 41 reach the retracted position shown on FIG. 3c. During the rearward movement, the arms 41 slide from under the transferred board layer 12, which consequently drops onto the forming stack 14. During the dropping step, rearward horizontal movement of the layer 12 to be deposited on the stack 14 is prevented by the movable stoppers 28, allowing the new layer 12 to be maintained over the stack 14. It is appreciated that the dropping step can include an initial reversal of the conveyor 32, as previously described, in order to remove any unwanted board(s) 11 which may have been transferred onto the stacking arms 41.

As previously mentioned, once the third step is completed, another cycle of the stacking routine can usually start with the repositioning of the arms 41 in the receiving position. It is appreciated that during the dropping step, a new board layer 12 was formed on the conveyor 32 and will transfer onto the stacking arms 41 once repositioned in the receiving position.

It will be appreciated from the foregoing disclosure that there is provided a board stacking system, which can dynamically adjust the length of the board stacking area 23 to correspond to a measured width of the board layers 12. As such, the system can offer substantial improvements over the known prior art in that, in virtue of its design and components, as explained herein, it advantageously enables to a) prevent the formation of stacks having uneven board layers (e.g., board layers having one more or less board than the other layers); b) reduce costs associated with large equipment configured for forming board layers in advance; c) provide continuous production/processing of wooden boards and/or board layers, among other advantages. However, the scope of the claims should not be limited by the preferred embodiments set forth in the examples, but should be given the broadest interpretation consistent with the description as a whole.

The invention claimed is:

1. A lumber stacking system for stacking a plurality of board layers into a stack, the lumber stacking system comprising:
    a lumber stacking apparatus adapted to form the stack, the lumber stacking apparatus comprising:
        a stack holder comprising an adjustable stacking area having a support surface configured for supporting the stack, the stacking area having a length defined between a front edge and a back edge of the stack holder;
        one or more stacking arms operable to receive a board layer and subsequently arrange the board layer onto the forming stack;
    a lumber dispensing mechanism adjacent the lumber stacking apparatus and comprising:
        a conveyor for carrying lumber along a flow path; and
        a stop operable to engage the flow path and prevent forward movement of the lumber along the flow path, the stop being adapted to allow the lumber to gather side-by-side and in abutment with one another along the conveyor to form the board layers, the stop being further operable to disengage the flow path when the board layer is formed to enable transferring individual board layers from the conveyor onto the stacking arms; and a scanner positioned to monitor a section of the conveyor proximate the stop and configured for measuring respective widths of individual board layers blocked by the stop prior to being transferred to the lumber stacking apparatus, the scanner being operatively connected to the lumber stacking apparatus and configured to transmit the measured width of a most recently measured board layer to the stack holder, wherein prior to each individual board layer being transferred onto the stacking arms, the stack holder is operable to dynamically adjust the length of the stacking area to substantially correspond to the width of the most recently measured board layer measured width.

2. The stacking system according to claim 1, wherein the stack holder comprises one or more movable stoppers operatively mounted proximate the rear edge adapted to move towards and away from the front edge to adjust the length of the stacking area.

3. The stacking system according to claim 2, wherein the movable stoppers are adapted to retain the board layer within the stacking area upon retraction of the stacking arms.

4. The stacking according to claim 2, wherein the stacking arms are operable between a receiving position where the stacking arms extend above the stack and across the length of the stacking area for receiving and supporting a corresponding board layer, and a retracted position where the stacking arms slide rearwardly from under the supported board layer, thereby dropping the board layer onto the stack.

5. The stacking system according to claim 4, wherein the movable stoppers have contact sensors configured to detect contact with the movable stoppers, and wherein displacement of the stacking arms into the retracted position is initiated upon engagement of a first dispensed board with the movable stoppers.

6. The stacking system according to claim 1, wherein each board layer includes a predetermined number of boards.

7. The stacking system according to claim 1, wherein the stack holder is further adapted to adjust a depth of the stacking area so as to lower the stack subsequently to the dropping of each board layer thereon.

8. The stacking system according to claim 2, wherein the stack holder comprises a controller adapted to receive the width of the layer of boards previously measured by the scanner, and wherein the controller is configured to operate the movable stoppers to adjust the length of the stacking area.

9. A method of forming a stack of lumber in a stacking area of a stack holder using boards being carried along a flow path, the method comprising:

in a layer-forming step, gathering a plurality of boards side-by-side and in abutment with one another along the flow path for forming a board layer;

in a measuring step, measuring a width of the board layer using a scanner positioned to monitor a section of the flow path where the plurality of boards are gathering to form the board layer;

in a transmission step, transmitting the width of the board layer to the stack holder;

in an adjustment step, dynamically operating the stack holder to adjusting a length of the stacking area to substantially correspond to the width of the board layer;

in a transfer step, transferring the corresponding board layer in the stacking area; and cyclically repeating the layer-forming step, the measuring step, the transmission step, the adjustment step and the transfer step until the stack is complete.

* * * * *